(12) United States Patent
Yu

(10) Patent No.: US 8,913,508 B2
(45) Date of Patent: Dec. 16, 2014

(54) REAL-TIME CHARGING SYSTEM AND METHOD FOR MANAGING QOS AND CHARGING RULE OF SERVICE

(75) Inventor: Su Jung Yu, Seoul (KR)

(73) Assignee: Samsung Electronics Co., Ltd (KR)

( * ) Notice: Subject to any disclaimer, the term of this patent is extended or adjusted under 35 U.S.C. 154(b) by 949 days.

(21) Appl. No.: 12/871,340

(22) Filed: Aug. 30, 2010

(65) Prior Publication Data

US 2011/0051615 A1 Mar. 3, 2011

(30) Foreign Application Priority Data

Aug. 28, 2009 (KR) ........................ 10-2009-0080753

(51) Int. Cl.
H04J 3/14 (2006.01)
H04L 12/24 (2006.01)
H04L 12/14 (2006.01)

(52) U.S. Cl.
CPC ........ H04L 41/5029 (2013.01); H04L 41/5003 (2013.01); H04L 12/14 (2013.01)
USPC ........................................... 370/252; 705/34

(58) Field of Classification Search
None
See application file for complete search history.

(56) References Cited

U.S. PATENT DOCUMENTS

| 8,326,262 | B2 * | 12/2012 | Duan et al. ..................... 455/406 |
|---|---|---|---|
| 2002/0046136 | A1 * | 4/2002 | Kawazoe ........................ 705/26 |
| 2007/0165803 | A1 * | 7/2007 | Duan ....................... 379/114.03 |
| 2009/0182883 | A1 * | 7/2009 | Giaretta et al. ............... 709/228 |
| 2009/0228956 | A1 * | 9/2009 | He et al. ........................... 726/1 |
| 2009/0254494 | A1 * | 10/2009 | Li et al. ........................... 705/400 |
| 2009/0311989 | A1 * | 12/2009 | Duan et al. ..................... 455/406 |
| 2010/0017846 | A1 * | 1/2010 | Huang et al. ........................ 726/1 |
| 2011/0051615 | A1 * | 3/2011 | Yu ................................. 370/252 |
| 2011/0208853 | A1 * | 8/2011 | Castro-Castro et al. ....... 709/223 |
| 2011/0238547 | A1 * | 9/2011 | Belling et al. .................. 705/34 |

FOREIGN PATENT DOCUMENTS

| JP | 2004-153777 | 5/2004 |
|---|---|---|
| JP | 2006-018626 | 1/2006 |
| KR | 1020050044805 | 5/2005 |
| KR | 1020080032529 | 4/2008 |
| WO | WO 2004/036890 | 4/2004 |

OTHER PUBLICATIONS

Certified English Translation of Korean Priority Document, 10-2009-0080753 filed Aug. 28, 2009, and translaied by Mi-hyeon Seo dated Aug. 1, 2014.*

* cited by examiner

*Primary Examiner* — Andrew Lai
*Assistant Examiner* — Leon Andrews
(74) *Attorney, Agent, or Firm* — The Farrell Law Firm, P.C.

(57) ABSTRACT

A method for controlling a charging condition change in a real-time charging system that sends a QoS and charging rule request to be applied to a user terminal from a packet processing node to a real-time charging function server. If a charging condition change is detected, a charging rule change request is sent to a management server and a changed QoS and charging rule is sent, from the management server to the real-time charging function server. The changed QoS and charging rule is sent from the QoS and charging rule management server to the packet processing node. The changed QoS and charging rule are forwarded from the packet processing node to the real-time charging function server and, at the real-time charging function server, quotas for the user terminal are reallocated according to the changed QoS and charging rule.

28 Claims, 4 Drawing Sheets

REAL-TIME CHARGING SYSTEM AND METHOD FOR MANAGING QOS AND CHARGING RULE OF SERVICE

PRIORITY

This application claims priority under 35 U.S.C. §119(a) to an application filed in the Korean Intellectual Property Office on Aug. 28, 2009, and assigned Serial No. 10-2009-0080753, the contents of which are incorporated herein by reference.

BACKGROUND OF THE INVENTION

1. Field of the Invention

The present invention generally relates to a communication system and, in particular, to a real-time charging system and method for a communication system that is capable of managing the charging information related to the services provided to a user terminal and updating a QoS and charging rule efficiently in real time.

2. Description of the Related Art

FIG. 1 is a schematic diagram illustrating a conventional real-time charging system. As shown in FIG. 1, the conventional real-time charging system includes a packet processing node (Policy and Charging Enforcement Function) 100, a QoS and charging rule management server (Policy and Charging Rule Management) 200, and a real-time charging function server (Real Time Charging Function) 300 deployed in a network 20.

The packet processing node 100 interoperates with the QoS and charging rule management server 200 and receives QoS and a Policy and Charging Control Rule from the QoS and charging rule management server 200. The packet processing node 100 requests the Real-time charging function server 300 for a real-time charging amount according to the QoS and Policy and Charging Control Rule.

FIG. 2 is a diagram illustrating how to deliver a charging rule in the conventional real-time charging system.

As shown in FIG. 2, a user terminal 10 can be connected to a plurality of packet processing node 100 (100a, 100b, . . . , 100n) and serviced by individual packet processing nodes 100. Each packet processing node requests the QoS and charging rule management server 200 to send a QoS and a charging rule for providing a packet service. The QoS and charging rule management server 200 sends the QoS and charging rule defined per user terminal to the packet processing node 100. Upon receipt of the QoS and charging rule, the packet processing node 100 requests the real-time charging function server 300 for quotas fulfilling the QoS and charging rule. The Real-time charging function server 300 checks the QoS and charging rule and allocates the quota quota fulfilling the QoS and charging rule to the packet processing node 100.

However, when the QoS and charging rule is changed in the middle of the real-time charging service, there is no function to inform the change of QoS and charging rule from the real-time charging function server 300 to the QoS and charging rule management server 200 and/or the packet processing node 100 in the conventional wireless communication system. Conventionally, the Real-time charging function server 300 informs the packet processing node 100 of the change in QoS and charging rule and then the packet processing node reports the change to the QoS and charging rule management server 200, but this method increases the traffic overload. Also, this conventional method has another drawback in that the QoS and charging rule cannot be changed before the packet processing node 100 re-requests the real-time charging function server 300 for quota allocation when it is running out of quotas allocated to the user terminal 10.

SUMMARY OF THE INVENTION

In order to solve the problems of the prior art, the present invention provides a real-time charging system and method for a communication system that is capable of efficiently managing the QoS and service charge in real time.

In accordance with an aspect of the present invention, a method for controlling charging condition change in real-time charging system including a packet processing node providing a service to at least one user terminal, a real-time charging function server for allocating quota to the user terminal, and a QoS and charging rule management server includes sending, if the user terminal requests the service, a QoS and charging rule request to be applied to the user terminal from the packet processing node to the real-time charging function server; sending, in response to the QoS and charging rule request, a QoS and charging rule response from the real-time charging function server to the packet processing node; sending, if a charging condition change is detected, a charging rule change request from the real-time charging function server to the QoS and charging rule management server; sending, in response to the charging rule change request, a changed QoS and charging rule, from the QoS and charging rule management server to the real-time charging function server; sending the changed QoS and charging rule from the QoS and charging rule management server to the packet processing node; forwarding the changed QoS and charging rule from the packet processing node to the real-time charging function server; and reallocating, at the real-time charging function server, quotas for the user terminal according to the changed QoS and charging rule.

In accordance with another aspect of the present invention, a real-time charging system includes a packet processing node which provides at least one user terminal with a service using quotas allocated to the user terminal; a real-time charging function server which allocates quota for the user terminal according to a QoS and charging rule of the user terminal which is informed by the packet processing node, and if a charging condition change is detected while providing the service, requests for change of the charging rule; and a QoS and charging rule management server which changes the QoS and charging rule in response to the request for changing of the charging rule and sends the changed QoS and charging rule to the packet processing node.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF EMBODIMENTS OF THE PRESENT INVENTION

In the following description, the term 'credit' denotes quotas allocated by the real-time charging function server 300 in order for the packet processing node to provide the user terminal with services and can include allowed service duration, packet amount, and money corresponding to the volume of the service.

The term 'real-time charging service' denotes the service for charging the sum of money for the used quota amount to the user terminal in real time.

The term 'QoS and charging rule' denotes the charging policy determined per service provider and applied when the real-time charging service starts.

Embodiments of the present invention are described in detail with reference to the accompanying drawings. The same reference numbers are used throughout the drawings to refer to the same or like parts. A detailed description of well-known functions and structures incorporated herein may be omitted to avoid obscuring the subject matter of the present invention.

Figure 1:
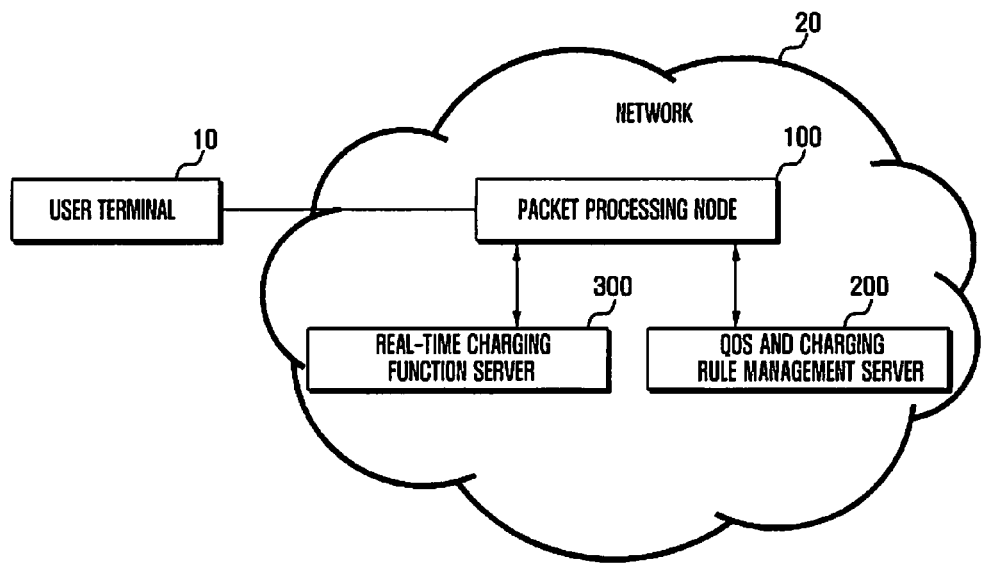
FIG. 1 is a schematic diagram illustrating a conventional real-time charging system.
Figure 2:
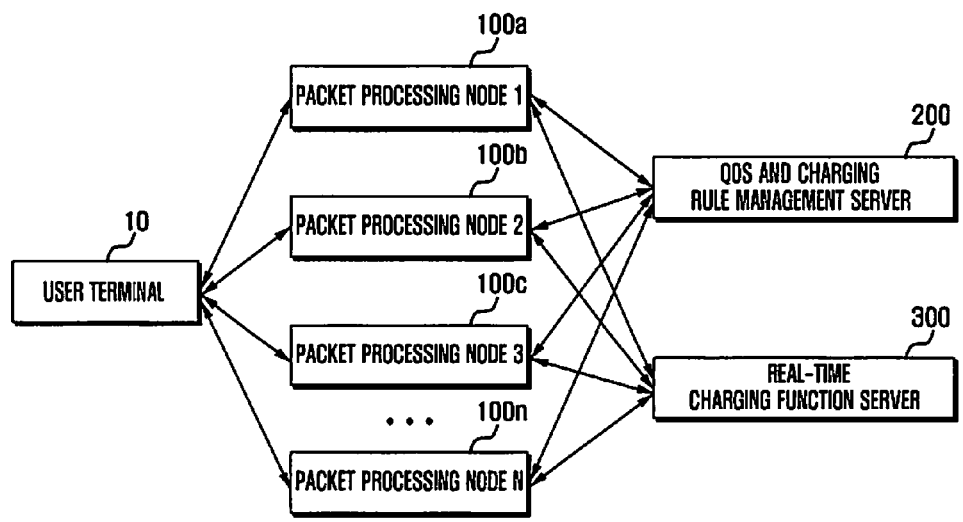
FIG. 2 is a diagram illustrating how to deliver a charging rule in the conventional real-time charging system.
Figure 3:
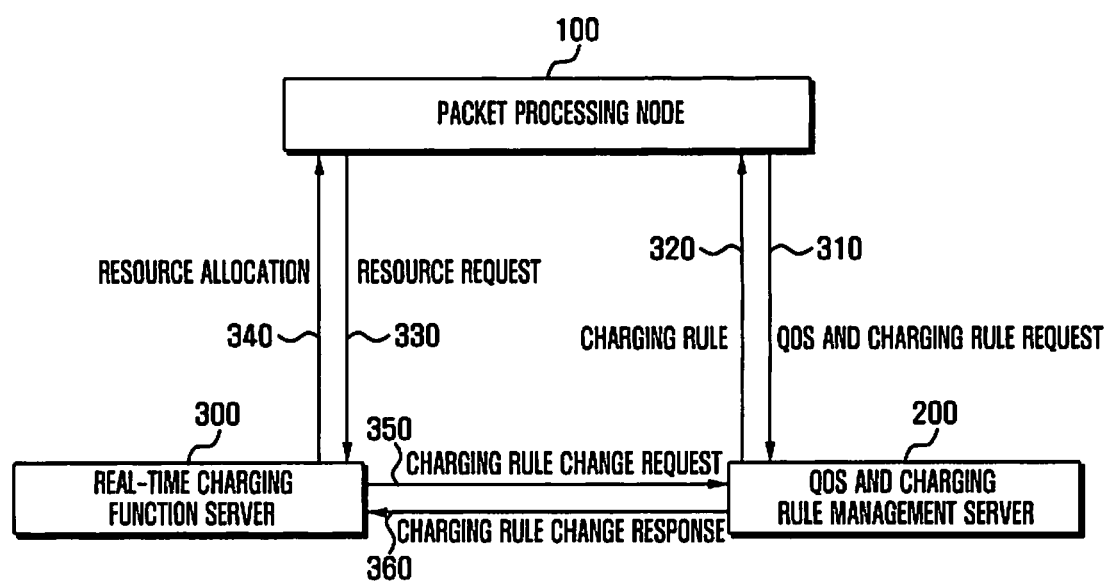
FIG. 3 is a diagram illustrating a real-time charging system for a communication system according to an embodiment of the present invention.

FIG. 3 is a diagram illustrating a real-time charging system for a communication system according to an embodiment of the present invention.

As shown in FIG. 3, the real-time charging system includes a packet processing node 100, a QoS and charging rule management server 200, and a real time charging function server 300. Here, the QoS and charging rule management server 200 and the real-time charging function server 300 are connected through an interface defined by the Diameter protocol. Diameter protocol uses AVP (Attribute Value Pair) that is based on Diameter Credit Control Application of RFC 4006, and 3GPP TS32.299 Telecommunication management; Charging management; Diameter charging applications, 3GPP TS Policy and charging control over Gx reference point, 3GPP TS 29.214 3. Policy and charging control over Rx are standard protocols related Diameter protocol.

The packet processing node 100 is responsible for managing the QoS and charging rule and the quotas charged in real time. The QoS and charging rule management server 200 is responsible for determining the QoS and charging rule per user terminal. The real-time charging function server 300 is responsible for allocating the quotas to the terminal according to the charging request determined by the QoS and charging rule management server 200.

There is a communication interface established between the real-time charging function server 300 and the QoS and charging rule management server 200. The real-time charging function server 300 can send the changed charging information per service to the QoS and charging rule management server 200 through the communication interface.

If a real time charging service is requested by the user terminal, the packet processing node 100 requests the QoS and charging rule management server 200 for the QoS and charging rule to be applied to the user terminal (310). At this time, the packet processing node 100 sends the device information of the user terminal to the QoS and charging rule management server 200 along with the QoS and charging rule request.

The QoS and charging rule management server 200 checks the QoS and charging rule to be applied to the user terminal which is requested by the packet processing node 100 and notifies the packet processing node 100 of the QoS and charging rule (320). At this time, the packet processing node 100 identifies the QoS and charging rule of the user terminal based on the unique device information of the user terminal.

If the QoS and charging rule is received, the packet processing node 100 requests the real-time charging function server 300 for quota allocation according to the QoS and charging rule (330). The real-time charging function server 300 checks the QoS and charging rule and allocates the quota according to the checked QoS and charging rule (340). In more detail, the real-time charging function server 300 identifies the account issued to the user terminal requesting the service and checks the previous charging information of the account and determines the quotas to be used according to the QoS and charging rule available for the identified account. The real-time charging function server 300 updates the previous charging information with the new charging information for the quotas allocated in association with the account. Here, the charging information means the information about the quota amount used in the amount of the quotas allocated for the account of the user terminal or the quota amount used among the quotas retained in the account.

If the charging condition change event occurs, the real-time charging function server 300 requests the QoS and charging rule management server 200 to change the charging rule (350). The charging condition change event can occur according to the amount of the quotas required at the user terminal depending on the channel conditions between the user terminal and the packet processing node.

For example, suppose that the quota amount for providing a service to the user terminal periodically is 10 and the allocated quota amount is 8. If the allocated quota is exhausted, the packet processing node 100 requests the real-time charging function server 300 to allocate quotas. That is, the allocated quota amount of 8 is less than the quota amount of 10 required to provide the user terminal with the service, and there is a quota shortage of as much as 2. Accordingly, the packet processing node 100 sends requests to the real-time charging function server 300 at more frequent intervals. In this case, the real-time charging function server 300 detects the charging condition change event by referencing the charging information related to the previously allocated quota and starts monitoring.

The charging condition change event is described under the assumption that the service charging rate changes according to the service usage duration (e.g., the service charging rate is 50 cents per 10 seconds for the service usage duration less than 10 minutes and 30 cents per 10 seconds for the service usage duration greater than 10 minutes). If the user terminal uses the service over 10 minutes, the real-time charging function server 300 requests the QoS and charging rule management server 200 to change the charging rule. If the charging rule change is requested by the real-time charging function server 300, the QoS and charging rule management server 200 can change the charging rule such that the service charging rate is changed from 50 cents per 10 seconds to 30 cents per 10 seconds.

As another example, suppose that the service usage amount of a fixed amount service user is excessive (e.g., when using the fixed amount service at the QoS level of 5 in the range of QoS levels from 1 to 10). If the user terminal uses the services over 10 Gbyte, the real-time charging function server 300 requests the QoS and charging rule management server 200 to change the charging rule. If the charging rule change is requested by the real-time charging function server 300, the QoS and charging rule management server 200 can change the QoS level from level 5 to level 4.

If the charging rule change is requested, the QoS and charging rule management server 200 changes the QoS and charging rule. Next, the QoS and charging rule management server 200 sends a charging rule change response to the real-time charging function server 300. Although not depicted in FIG. 3, the QoS and charging rule management server 200 sends the changed QoS and charging rule to the packet processing node 100. If the changed QoS and charging rule is received, the packet processing node 100 requests the real-time charging function server 300 to allocate quotas according to the changed QoS and charging rule. The real-time charging function server 300 allocates quotas according to the changed QoS and charging rule such that the packet processing node 100 provides the user terminal with the service.

The real-time charging function server 300 and the QoS and charging rule management server 200 can exchange the charging rule change request and response message by means of a communication protocol such as Diameter protocol. The Diameter protocol is the protocol supporting reliable transport protocol such as Stream Control Transmission Protocol (SCTP) and operating based on a session.

Figure 4:
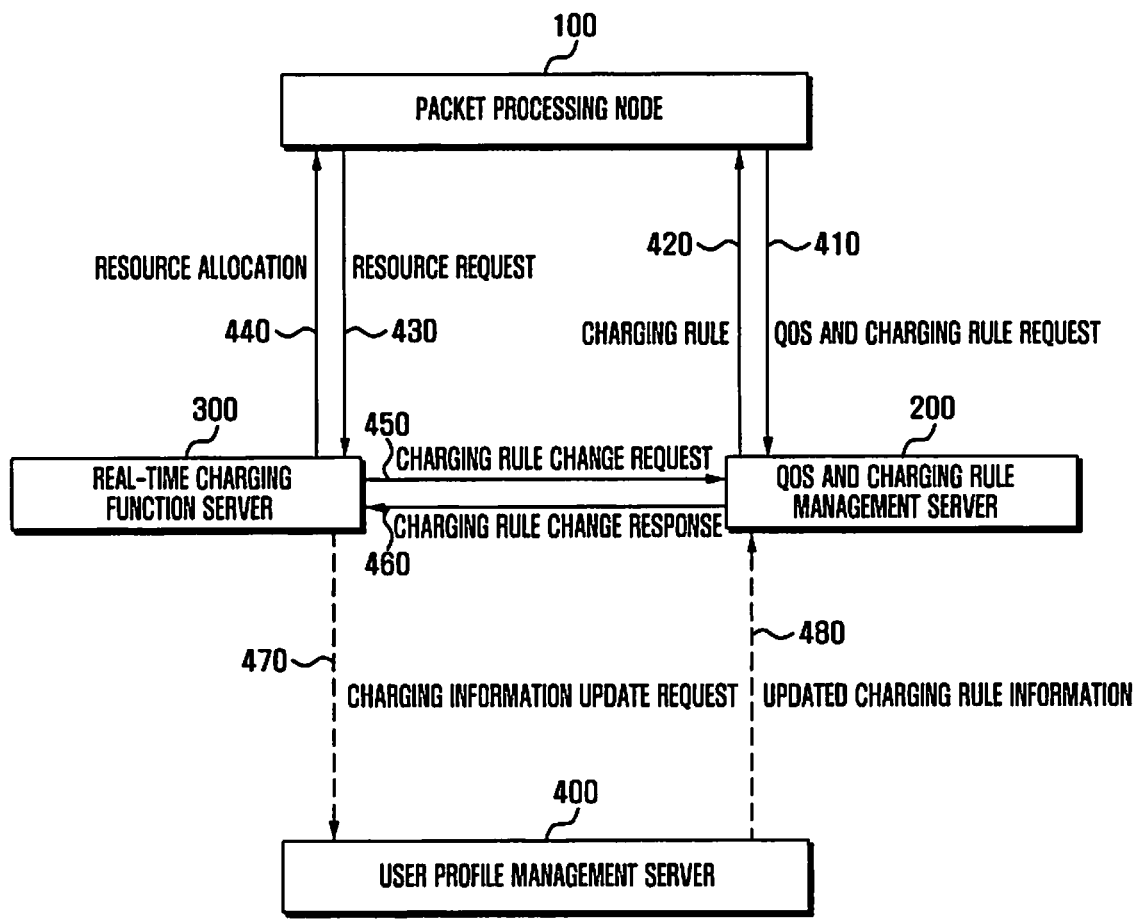
FIG. 4 is a diagram illustrating a real-time charging system for a communication system according to another embodiment of the present invention.

FIG. 4 is a diagram illustrating a real-time charging system for a communication system according to another embodiment of the present invention.

As shown in FIG. 4, the real-time charging system includes a packet processing node 100, a QoS and charging rule management server 200, a Real Time Charging Function server 300, and a user profile management server 400. Here, the QoS and charging rule management server 200 and the real-time charging function server 300 are connected through an interface defined by the Diameter protocol. The user profile management server 400 is responsible for storing unique device information of the user terminal, charging information about the quotas allocated to the user terminal, and the QoS and charging rule. The device information is the information for identifying the user terminal such as a device ID and unique device number.

If a real-time charging service is requested by the user terminal, the packet processing node 100 requests the QoS and charging rule management server 200 for the QoS and charging rule (410). At this time, the packet processing node 100 sends the device information of the user terminal to the QoS and charging rule management server 200 along with the QoS and charging rule request. The QoS and charging rule management server 200 checks the QoS and charging rule to be applied to the user terminal and notifies the packet processing node 100 of the QoS and charging rule (420).

If the QoS and charging rule is received, the packet processing node 100 requests the real-time charging function server 300 to allocate quotas according to the QoS and charging rule (430). The real-time charging function server 300 checks the QoS and charging rule and allocates the quota according to the checked QoS and charging rule (440).

If the charging condition change event occurs, the real-time charging function server 300 requests the QoS and charging rule management server 200 to change the charging rule (450). In response to the charging rule change request, the QoS and charging rule management server 200 changes the QoS and charging rule and sends a charging rule change response to the real-time charging function server 300 (460). Although not depicted in the FIG. 4, the QoS and charging rule management server 200 sends the changed QoS and charging rule to the packet processing node 100. If the changed QoS and charging rule is received, the packet processing node 100 requests the real-time charging function server 300 to allocate quotas according to the changed QoS and charging rule. The real-time charging function server 300 allocates resources according to the changed QoS and charging rule such that the packet processing node 100 provides the user terminal with the service.

Next, the real-time charging function server 300 requests the user profile management server 400 to update the charging information according to the change of the charging rule (470). In more detail, if a charging condition change event is detected, the real-time charging function server 300 sends a request for the user profile update, and the user profile management server 400 updates charging information of the corresponding user terminal and then notifies the QoS and charging rule management server 200 of the update of the charging information (480).

Figure 5:
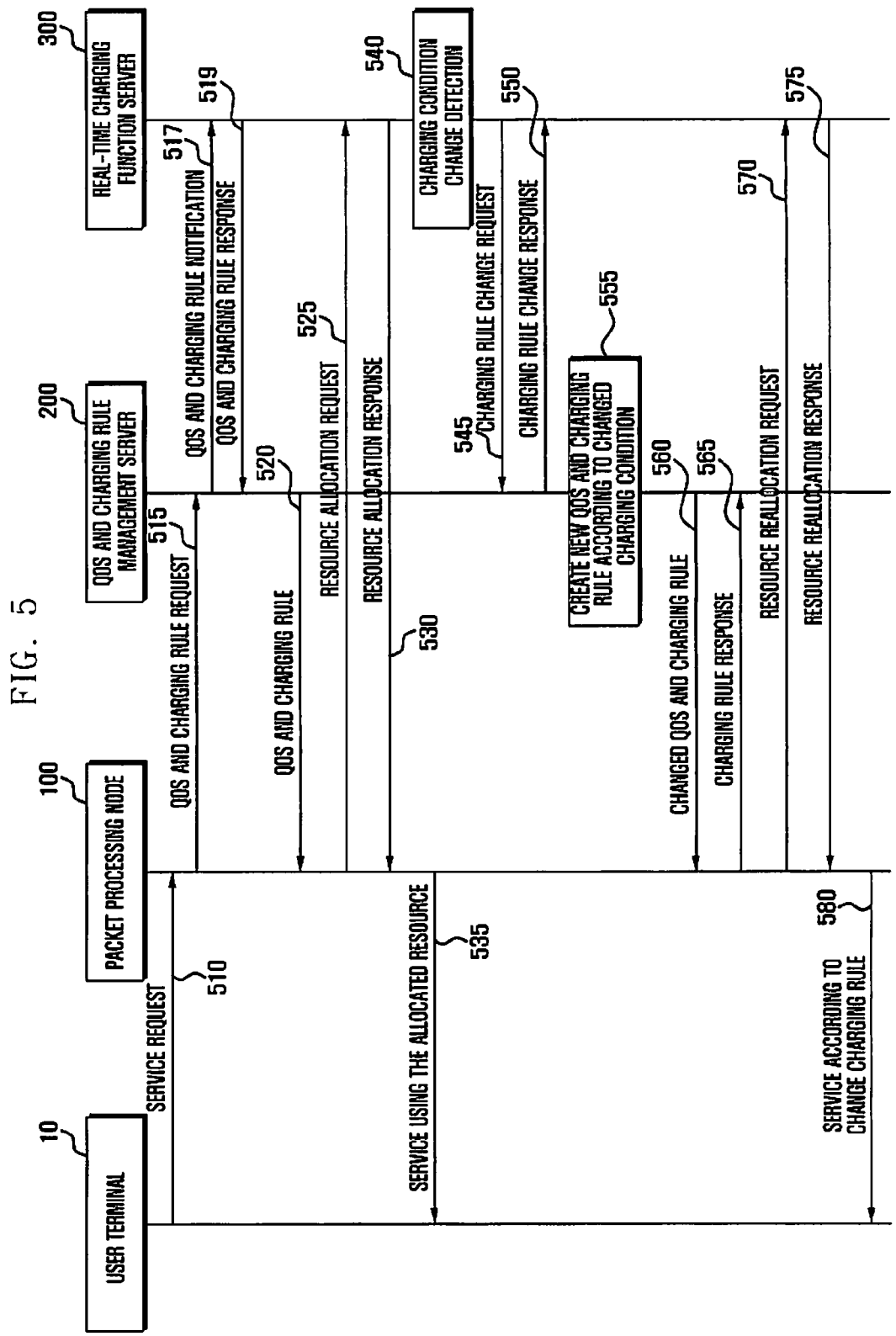
FIG. 5 is a flow diagram illustrating operations of network entities for the charging rule change method in a real-time charging system according to an embodiment of the present invention.

FIG. 5 is a sequence diagram illustrating operations of network entities for the charging rule change method in a real-time charging system according to an embodiment of the present invention.

Referring to FIG. 5, the user terminal 10 sends a service request message to the packet processing node 100 (510). Upon receipt of the service request message, the packet processing node 100 sends a QoS and charging rule request message to the QoS and charging rule management server 200 (515). The QoS and charging rule management server 200 checks the QoS and charging rule defined for the user terminal 10 and sends a QoS and charging rule notification message to the real-time charging function server 300 to notify of the QoS and charging rule of the user terminal 10 (517). In more detail, the QoS and charging rule management server 200 notifies the real-time charging function server 300 of the QoS and charging rule of the Policy and Charging Control (PCC) rule for usage determination. The real-time charging function server 300 sends a QoS and charging rule response message in response to the QoS and charging rule notification message (519). With the QoS and charging rule response message sent by the real-time charging function server 300, the QoS and charging rule server 200 makes a determination on the user usage.

If the QoS and charging rule response message is received, the QoS and charging rule management server 200 sends the checked QoS and charging rule to the packet processing node 100 in response to the QoS and charging rule request message (520). If the QoS and charging rule is received, the packet processing node 100 sends a quota allocation request message to the real-time charging function server 300 (525). The real-time charging function server 300 sends a quota allocation response message to the packet processing node 100 in response to the quota allocation request message (530).

In more detail, if the packet processing node 100 requests the real-time charging function server 300 to allocate quotas for the user terminal 100, the real-time charging function server 300 checks the account of the user terminal 10 and the QoS and charging rule used in association with the account and allocates quotas based on the checked result. Next, the real-time charging function server 300 sends the information on the allocated quotas to the packet processing node 100. Although not depicted in FIG. 5, the QoS and charging rule management server 200 and the real time charging function server 300 exchange the service request information of the user terminal. This process is maintained until the service to the user terminal ends. If there is a change in the usages managed by the QoS and charging rule management server 200, the QoS and charging rule management server 200 can notify the real-time charging function server 300 of the change.

If the quota allocation response message is received at step 530, the packet processing node 100 provides the user terminal 10 with the service using the allocated quotas (535). Here, the quota can be the packet amount, time duration, or money allowed for transmission/reception. While the service is provided to the user terminal 10, the real-time charging function server 300 monitors to detect a charging condition change event. The charging condition change event can occur by the change of channel conditions between the user terminal 10 and the packet processing node 100 or the change of the quota amount consumed by the user terminal 10 during the service provision.

If a charging condition change event is detected (540), the real-time charging function server 300 sends a charging rule change request message to the QoS and charging rule management server 200 (545). The QoS and charging rule management server 200 sends a charging rule change response message to the real-time charging function server 300 in response to the charging rule change request message (550) and creates a new QoS and charging rule according to the changed charging condition (555). Next, the QoS and charging rule management server 200 sends the new QoS and charging rule to the packet processing node 100 (560). The packet processing node 100 sends a charging rule response message to the QoS and charging rule management server 200 in response to the receipt of the new QoS and charging rule (565).

Next, the packet processing node 100 sends a quota reallocation request message to the real-time charging function server 300 in order to request for the quota reallocation based on the changed charging rule (570). Upon receipt of the quota reallocation request message, the real-time charging function server 300 reallocates the quotas based on the changed charging rule and sends a quota reallocation response message to the packet processing node 100 (575). Upon receipt of the quota reallocation response message, the packet processing node 100 provides the user terminal 10 with the service according to the changed charging rule (580).

Although not depicted in FIG. 5, the real-time charging system further includes a user profile management server for managing the QoS per user. In this case, the real-time charging function server 300 manages the quotas for service charge per user, and the user profile server manages the quotas for QoS per user. The real-time charging function server 300 and the user profile management server interoperate with each other for synchronizing the quotas. If the charging condition change is detected, the real-time charging function server 300 can notify the user profile management server of the charging condition change immediately.

In a communication network, in an embodiment of the present invention, the QoS and charging condition can be changed according to charging-related information of the user terminal in a real-time charging service. In communication with the QoS and charging rule management server, the real-time charging function server can notify the QoS and charging rule management server of the charging condition change directly such that the change of the QoS and charging rule per user terminal can be reflected in real time.

Although embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A method for controlling a charging condition change by a Quality of Service (QoS) and charging rule management server in a real-time charging system, the method comprising:
   receiving changed charging condition information of a user terminal from a real-time charging function server allocating quotas to the user terminal;
   transmitting an acknowledgement message to the real-time charging function server; and
   creating a new charging rule according to the changed charging condition information.

2. The method of claim 1, further comprising:
   transmitting the new charging rule to a packet processing node; and
   receiving a response to the new charging rule from the packet processing node.

3. The method of claim 1, further comprising:
   receiving a request for the charging rule of the user terminal from a packet processing node managing the charging rule; and
   transmitting the charging rule to the packet processing node.

4. The method of claim 3, wherein the charging rule includes Policy and Charging Control (PCC) rules information.

5. The method of claim 1, wherein the changed charging condition information is detected by the real-time charging function server.

6. The method of claim 1, wherein the changed charging condition information includes at least one of information of the user terminal and information of a service provided to the user terminal.

7. A method for controlling a charging condition change by a real-time charging function server allocating quotas to a user terminal in a real-time charging system, the method comprising:
   detecting the charging condition change of the user terminal;
   transmitting changed charging condition information to a Quality of Service (QoS) and charging rule management server; and
   receiving an acknowledgement message from the QoS and charging rule management server.

8. The method of claim 7, further comprising:
   receiving a quota reallocation request message according to the changed charging condition information from a packet processing node managing a charging rule; and
   reallocating quotas based on the changed charging condition to the packet processing node.

9. The method of claim 7, wherein the changed charging condition information includes at least one of information of the user terminal and information of a service provided to the user terminal.

10. A method for controlling a charging condition change by a packet processing node managing a charging rule in a real-time charging system, the method comprising:
    transmitting a request for a charging rule of a user terminal to a Quality of Service (QoS) and charging rule management server;
    receiving the charging rule from the QoS and charging rule management server;
    receiving a new charging rule from the QoS and charging rule management server; and
    transmitting a response to the new charging rule to the QoS and charging rule management server.

11. The method of claim 10, wherein the new charging rule is created according to a changed charging condition information transmitted from a real-time charging function server allocating quotas to the user terminal to the QoS and charging rule management server.

12. The method of claim 11, wherein the changed charging condition is detected by the real-time charging function server.

13. The method of claim 11, further comprising:
transmitting a quota reallocation request message according to the changed charging condition information to the real-time charging function server; and
receiving quotas reallocation based on the changed charging condition from the real-time charging function server.

14. The method of claim 10, wherein the charging rule includes Policy and Charging Control (PCC) rules information.

15. A Quality of Service (QoS) and charging rule management server in a real-time charging system for controlling a charging condition change, comprising:
a transceiver for transmitting and receiving a signal; and
a controller for receiving changed charging condition information of a user terminal from a real-time charging function server allocating quotas to the user terminal, transmitting an acknowledgement message to the real-time charging function server, and creating a new charging rule according to the changed charging condition information.

16. The QoS and charging rule management server of claim 15, wherein the controller further transmits the new charging rule to a packet processing node and receives a response to the new charging rule from the packet processing node.

17. The QoS and charging rule management server of claim 15, wherein the controller further receives a request for the charging rule of the user terminal from a packet processing node managing the charging rule and
transmits the charging rule to the packet processing node.

18. The QoS and charging rule management server of claim 17, wherein the charging rule includes Policy and Charging Control (PCC) rules information.

19. The QoS and charging rule management server of claim 15, wherein the changed charging condition information is detected by the real-time charging function server.

20. The QoS and charging rule management server of claim 15, wherein the changed charging condition information includes at least one of information of the user terminal and information of a service provided to the user terminal.

21. A real-time charging function server allocating quotas to a user terminal in a real-time charging system for controlling a charging condition change, comprising:
a transceiver for transmitting and receiving a signal; and
a controller for detecting the charging condition change of the user terminal, transmitting changed charging condition information to a Quality of Service (QoS) and charging rule management server, and receiving an acknowledgement message from the QoS and charging rule management server.

22. The real-time charging function server of claim 21, wherein the controller further receives a quota reallocation request message according to the changed charging condition information from a packet processing node managing a charging rule and reallocates quotas based on the changed charging condition to the packet processing node.

23. The real-time charging function server of claim 21, wherein the changed charging condition information includes at least one of information of the user terminal and information of a service provided to the user terminal.

24. A packet processing node managing a charging rule in a real-time charging system for controlling a charging condition change, comprising:
a transceiver for transmitting and receiving a signal; and
a controller for transmitting a request for a charging rule of a user terminal to a Quality of Service (QoS) and charging rule management server, receiving the charging rule from the QoS and charging rule management server, receiving a new charging rule from the QoS and charging rule management server, and transmitting a response to the new charging rule to the QoS and charging rule management server.

25. The packet processing node of claim 24, wherein the new charging rule is created according to a changed charging condition information transmitted from a real-time charging function server allocating quotas to the user terminal to the QoS and charging rule management server.

26. The packet processing node of claim 25, wherein the changed charging condition is detected by the real-time charging function server.

27. The packet processing node of claim 25, wherein the controller further transmits a quota reallocation request message according to the changed charging condition information to the real-time charging function server and receives quotas reallocation based on the changed charging condition from the real-time charging function server.

28. The packet processing node of claim 24, wherein the charging rule includes Policy and Charging Control (PCC) rules information.

* * * * *